(12) United States Patent
Kurkowski et al.

(10) Patent No.: US 9,369,447 B2
(45) Date of Patent: Jun. 14, 2016

(54) SYSTEM AND METHOD TO SECURELY TRANSFER DATA

(71) Applicant: Maxim Integrated Products, Inc., San Jose, CA (US)

(72) Inventors: Hal Kurkowski, Dallas, TX (US); David Richard Gruetter, Fullerton, CA (US); Carlton Michael Haight, Dallas, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 13/797,567

(22) Filed: Mar. 12, 2013

(65) Prior Publication Data

US 2014/0281484 A1      Sep. 18, 2014

(51) Int. Cl.
*G06F 21/60* (2013.01)
*H04L 29/06* (2006.01)
*H04L 29/08* (2006.01)
*H04W 4/00* (2009.01)

(52) U.S. Cl.
CPC ........ *H04L 63/0471* (2013.01); *H04L 63/0428* (2013.01); *H04L 67/12* (2013.01); *H04W 4/006* (2013.01)

(58) Field of Classification Search
CPC ....... G06F 21/60; G06F 21/606; G06F 21/30; G06F 21/64; G06F 21/00; H04L 9/00; H04L 63/0428; H04L 63/00; H04W 12/00
See application file for complete search history.

(56) References Cited

U.S. PATENT DOCUMENTS

| | | | |
|---|---|---|---|
| 6,400,824 B1 * | 6/2002 | Mansoorian et al. | 380/269 |
| 2002/0186821 A1 * | 12/2002 | Eggers | 379/38 |
| 2003/0154056 A1 * | 8/2003 | Ito et al. | 702/188 |

* cited by examiner

*Primary Examiner* — Izunna Okeke
(74) *Attorney, Agent, or Firm* — North Weber & Baugh LLP (57) ABSTRACT

Various embodiments of the invention achieve optimal data security by adding a security layer to data at the point of generation. Some embodiments add a security feature to data that controls or configures a device at a physical interface.

15 Claims, 6 Drawing Sheets

FIGURE 6

SYSTEM AND METHOD TO SECURELY TRANSFER DATA

BACKGROUND

A. Technical Field

The present invention relates to secure data transmission, and more particularly, to systems, devices, and methods of securing devices that are remotely controlled over a network.

B. Background of the Invention

A rapidly increasing number of communication systems rely on transferring data over networks in order to remotely control devices, such as sensors and actuators that are connected to cloud-based computing architectures. Often large amounts of data is aggregated and transferred to servers or data centers that monitor incoming data and respond accordingly. For example, a distributed network of smoke detectors and temperature sensors may collect temperature data inside a building and transmit the data to a remotely located server that monitors one or more environmental conditions. The remote server continuously analyzes the data, and based on the results takes some action via one or more interfacing actuators, such as adjusting the temperature setting on an air-conditioning system or activating a sprinkler system in case of detecting a fire.

One major concern associated with data communication over networks that facilitate operation of automated equipment with no human interaction or oversight is the exposure to unauthorized or accidental data manipulation. Where data transfer and decision making are practically unsupervised, potential intruders can relatively easily intercept the data stream to carry out attacks on networked devices while remaining entirely undetected. Data interruption or partial data loss can render devices inoperative, as each device typically expects a predetermined sequence of data (e.g., a data protocol) to establish communication and transfer information. Data security is particularly important in certain applications, such as remotely operated medical devices, where a security breach may result in detrimental or even life threatening scenarios. Therefore, steps must be taken to ensure that data is transferred correctly and securely.

While some electronic devices afford limited protection by employing secure microcontrollers that add encryption to data prior to upstream transmission over a digital network, unsecured data at the device level and the microcontroller itself remain vulnerable to attack. Existing approaches leave the communication system still at significant risk of intentional data manipulation by potential intruders that seek out opportunities to interfere with networked devices that transmit or receive data. Data integrity of existing electronic devices is relatively easily compromised as no security measures are applied to the data prior to being secured by the microcontroller. Additionally, devices in which data is converted from digital to analog format or vice versa are oftentimes not equipped to verify the validity of the source of the data to ensure that transmitted data is sufficiently trustworthy to provide a desired level of protection.

What is need are tools to overcome the above-described limitations.

SUMMARY OF THE INVENTION

Various embodiments provide for optimized data security at a physical interface prior to sending the data upstream. In certain embodiments, data is digitized and secured at the point of information generation before being transmitted so as to ensure full chain of custody of the data.

Some embodiments provide for a security layer that is applied to the data within an electronic device that facilitates data conversion, such that the data remains safe from being compromised upstream later. Other data security operations include two-way authentication that requires validation of control commands prior to permitting modifications to a device coupled to a physical interface point. This ensures that data the device receives at the physical interface is valid and authorized and, thus, decisions based on that data are trustworthy.

Certain features and advantages of the present invention have been generally described here; however, additional features, advantages, and embodiments are presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

Figure ("FIG.") 1 shows a prior art system for securely transferring data.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

Figure 1:
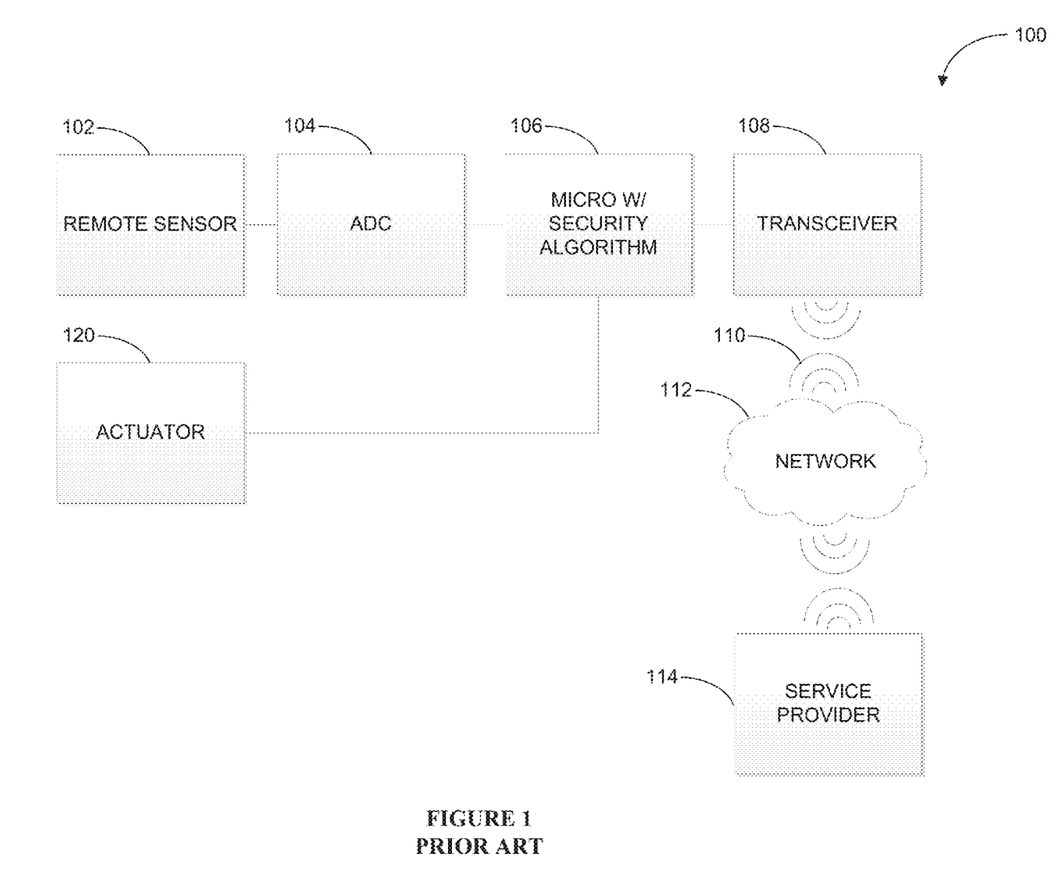

FIG. 1 shows a prior art system for securely transferring data. System 100 includes remote sensor 102, analog-to-digital converter (ADC) 104, microcontroller 106, transceiver 108, signal 110, network 112, service provider 114, actuator 120. System 100 receives analog data from remotely located sensor 102, converts the data into digital format via ADC 104, and then employs microcontroller 106 to encrypt the digital data. The encrypted data is then forwarded to transceiver 108, which transmits it to service provider 114 via network 112. Service provider 114 then decrypts the encrypted data and processes the decrypted data, as needed.

Remote sensor 102 is commonly a device that detects or measures a physical property for subsequent transmission to service provider 114. Remote sensor 102 may be a motion sensor, such as an occupancy sensor; an acoustic sensor, such as a microphone; a magnetic sensor, such as a Hall sensor; a chemical sensor, such as a smoke detector; or a blood pressure sensor that is remotely located and collects data that is then transmitted to service provider 114. Service provider 114 can be a hospital server that receives the data, decrypts it, and prepares it for a reading by a physician. Remote sensor 102 typically generates an analog output signal that is received by ADC 104 and converted into a digital signal. The digital output signal of ADC 104 is input to microcontroller 106 for encryption.

Microcontroller 106 typically is a device that includes a processor that is capable of dynamic processing and storing data in a memory. Microcontroller 106 communicates with any number of devices. Primarily, it receives the digital data from ADC 104 and applies an encryption algorithm that encodes and secures the digital data. Microcontroller 106 then sends the data to service provider 114 via transceiver 108. Transceiver 108 is a device used to transmit and/or receive information, such as signal 110, over network 112 and is often implemented as a single device. Network 112 represents any medium over which information can be communicated, such as a local network, a wide area network, a satellite network, etc. Network 112 is used to communicate the physical information that is collected by remote sensor 102 to service provider 114.

Network 112 is also used to transmit commands from service provider 114 to remote sensor 102 or actuator 120, for example, to effectuate physical action. In that case, encrypted data sent by service provider 114 is first received by transceiver 108 via network 112. The data is then decrypted by microcontroller 106 prior to being converted to a control command suitable to operate actuator 120.

Actuator 120 may be used to control a physical environment, for example, by adjusting temperature settings or ambient light conditions of the surroundings. Actuator 120 is typically an electromagnetically activated device, such as a switch assembly, that monitors an external circuit and responds to a control command received from service provider 114 and verified by microcontroller 106, which deciphers the encryption digital data command received from service provider 114. In some applications, actuator 120 converts digital data representing actions to be taken into analog data and acts upon a secured digital data command or instructions received from microcontroller 106.

However, neither remote sensor 102 nor actuator 120 are usually designed to verify the validity of the data these devices exchange with microcontroller 106. This leaves system 100 vulnerable to attack and re-programming by potential hackers; especially, when system 100 operates in an automated or semi-automated manner. Therefore, it would be desirable to have a system that ensures that all data within the communication system is transmitted securely and, thus, provides a high level of protection.

Figure 2:
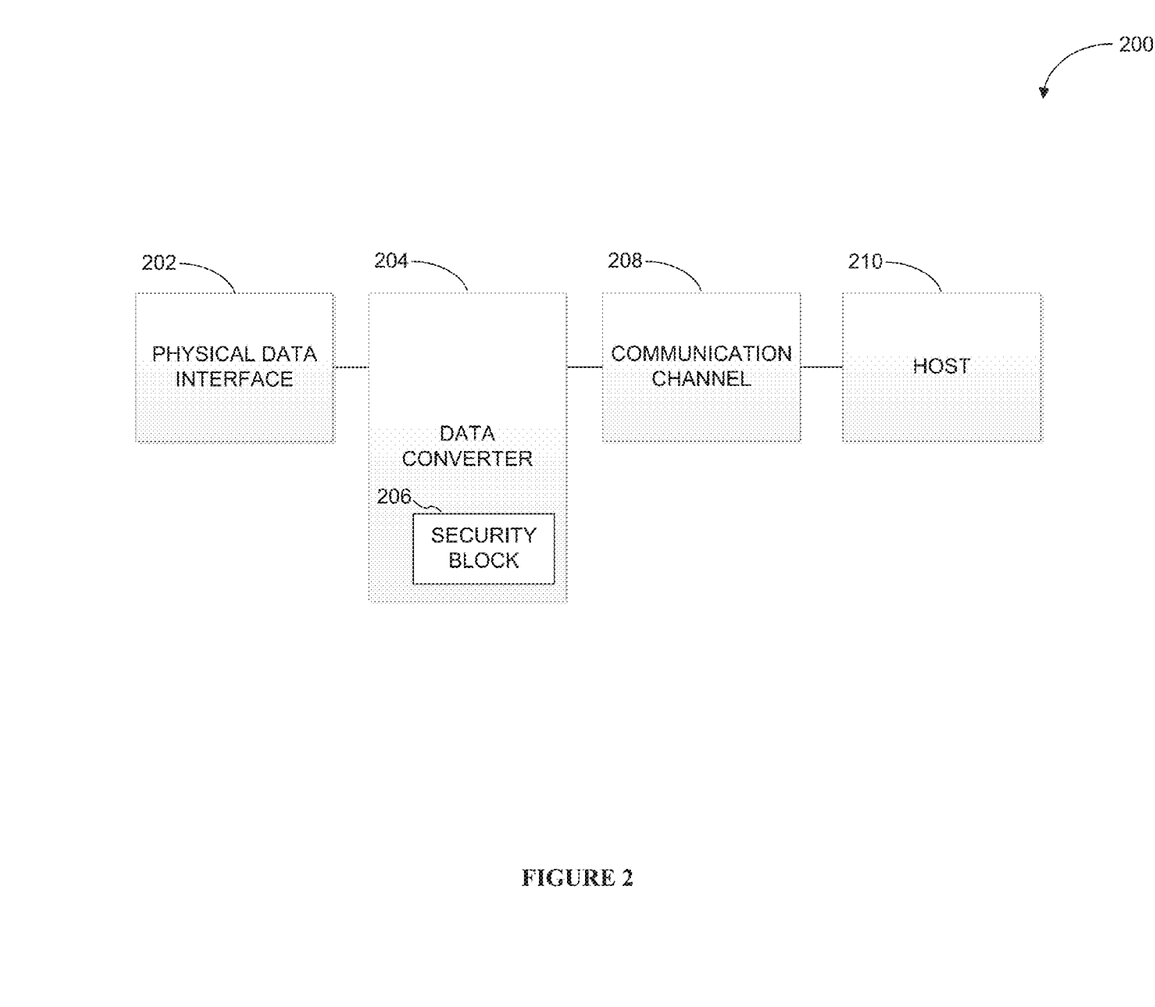
FIG. 2 shows an exemplary system that implements secure data processing according to various embodiments of the invention.

FIG. 2 shows an exemplary system that implements secure data processing according to various embodiments of the invention. System 200 includes physical data interface 202, data converter 204, which further comprises security block 206, communication channel 208, and host 210. Physical data interface 202 is configured to interact with a user or a device. Interface 202 may be coupled to a remote sensor (not shown) that generates, for example, analog data representing measured data taken at physical data interface 202. The sensor is any type of sensor, such as a temperature sensor, a blood pressure sensor, or a pulse oximetry sensor that is remotely located to collect data and generate a signal, such as a voltage, that can then be converted into a data signal. The data signal is representative of a physical property (e.g., temperature, illumination level, noise level, etc.) measured by the sensor. One skilled in the art will appreciate that physical data interface 202 may communicate with any number of devices, including actuators and transducers that may be configured to receive from host 210 commands representing instructions to effectuate an action or execute instructions.

Data converter 204 is configured to convert the format of data transmitted between physical data interface 202 and host 210. Data converter 204 comprises an ADC or digital-to-analog converter to convert analog data to digital data or vice versa. For example, analog measurement data taken by a remote sensor may be converted into digital data. In one embodiment, data converter 204 is implemented as a Programmable 10 (PIO).

In one embodiment, data converter 204 converts command data received from host 210 from a digital format to a corresponding analog format to enable a sensor or actuator coupled to physical data interface 202 to take a desired action. In addition to converting data, data converter 204 is configured to provide increased data security via security block 206. Security block 206 is configured to apply a security algorithm to data received from at least one of physical data interface 202 and host 210. Data converter 204 may also be configured to determine whether received data is secure. Details and examples of securing data by using various security protocols that can be employed by security block 206 are described below.

Depending on the type of data to be transferred, data may be secured prior, simultaneously with, or after conversion from one format to another. In one embodiment, data to be transmitted from physical data interface 202 to host 210 may be converted from analog to digital within data converter 204 prior to being secured by security block 206. In another example, when data is transmitted from host 210 to physical data interface 202, data may be secured and/or authenticated by security block 206 prior to being converted from digital to analog format.

Security block 206 is a device configured to secure or validate data, and execute any number of security protocols. Security block 206 may be implemented as a standalone hardware module or embedded into data converter 204. In one embodiment, security block 206 is a Security Algorithm Hardware Accelerator (SAHA) that is configured to manage the security of data to be transferred. In one embodiment, security block 206 is configured to apply a security protocol to the transmitted data to ensure data security. The security protocol, which may be pre-programmed, may add a security layer to the data or remove security-related information from the data. Security block 206 performs at least one of numerous security methods, including encryption, decryption, and authentication of security protocols.

The security protocol may also be used to encrypt and authenticate data. The security methods used by the security protocols comprise, for example, symmetric key hash functions, Public Key/Private Key Digital Signatures (PKDS), and/or full encryption. Authorization methods of data comprises, for example, encryption, authentication, validation, and decryption. Symmetric key hash functions are programmable modules that authenticate data to be transferred. Examples of symmetric key hash functions are Secure Hash Algorithm 1 (SHA-1) or Secure Hash Algorithm 2 (SHA-2). Public Key/PKDS are programmable modules that authenticate data to be transferred. Examples of PKDS functions include, for example, Elliptic Curve Digital Signature Algorithm (ECDSA). Full encryption functions are programmable modules that authenticate data to be transferred. Examples of full encryption methods include, for example, the Data Encryption Standard (DES), Triple Data Encryption Standard (3-DES), and the Rivest-Shamir-Adleman method (RSA). The security protocols of security block 206 may also determine the validity of the data to be transferred. In one embodiment, system 200 determines that the data received is incomplete or has been tampered with based on inconsistencies in the data.

Communication channel 208 is coupled between data converter 204 and host 210 to establish communication from host 210 to a data converter 204 and vice versa. Communication channel 208 is used to communicate over any wired or wireless protocol known in the art, including, Wi-Fi, Wi-Max, 4G LTE, UMTS, infrared, and Zigbee. In one embodiment, communication channel 208 is a cellular data network that establishes communication between a cellular device and host 210.

Host 210 is any upstream device, such as a remote server. Host 210 may comprise a non-transitory logic circuit capable of processing data and communicating with data converter 204 via communication channel 208 to exchange information. For example, host 210 may be a service provider that sends and receives information in order to provide a particular service. The services provided may include monitoring of health information via remote sensors that are coupled to physical data interface 202, and sending commands to the sensors to change the setting of a health monitor, adjust a medical device, or adjust a room temperature.

System 200 may communicate with any other element of the system using protocols, such as 1-Wire®, universal asynchronous receiver/transceiver (UART), inter-integrated circuit ($I^2C$), serial peripheral interface (SPI), radio frequency (RF), wireless (Wi-Fi, Wi-Max), Ethernet, universal serial bus (USB), or any other suitable protocol.

In one embodiment, system 200 comprises a sensor and an actuator (not shown) coupled to physical data interface 202. The sensor is configured to securely transfer data to host 210 and receive a command response from host 210. Based on the data, system 200 then takes action based on the command response using the actuator. In one embodiment, system 200 is entirely automated, such that in operation no human interaction is required. In this example, system 200 comprises an insulin level sensor coupled to physical interface 202 to detect insulin level data and transmit the information to host 210. An insulin pump coupled to physical interface 202 serves as an actuator that receives instructions from host 210 and responds to a command by adjusting the insulin dispense rate of a patient to an appropriate, predetermined value. The bi-directional data transmitted between sensor and host 210 are, thus, secured by system 200.

One skilled in the art will appreciate that system 200 may comprise additional components necessary for converting, processing, and securing data, such as logic devices, interface devices, power sources, and memory.

Figure 3:
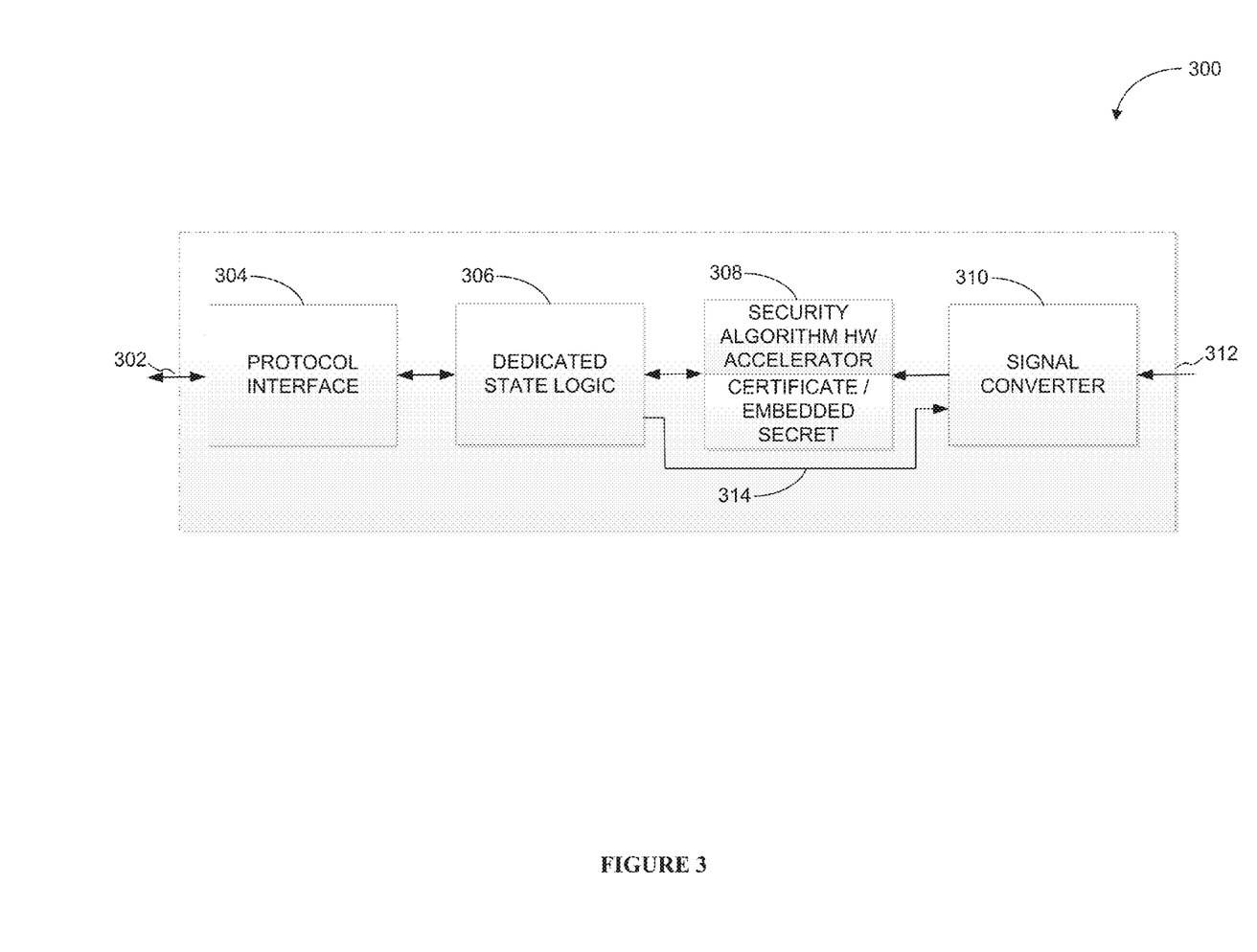
FIG. 3 is an exemplary functional block diagram of a sensor to securely process data according to various embodiments of the invention.

FIG. 3 is an exemplary functional block diagram of a sensor to securely process data according to various embodiments of the invention. Secure sensor 300 comprises signal converter 310, SAHA 308, which may comprise a digital certificate and/or embedded secret, dedicated state logic 306, and protocol interface 304. Secure sensor 300 may communicate with a host or any other computing system known to one of skill in the art via communication channel 302.

Signal converter 310 is, for example, an ADC that receives input signal 312 in the form of an unsecured analog or digital signal. Input signal 312 is an application stimulus that comprises information, such as data representative of an environmental condition or event, an input level, etc. In one embodiment, signal converter 310 converts unsecured signal 312 into a digital data signal that is subsequently secured by SAHA 308.

SAHA 308 is any device configured to process and secure the unsecured digital data received from signal converter 310. SAHA 308 accomplishes this by numerous security methods, including the use of symmetric key hash functions, electronic signatures using public or private keys, encryption, and other security protocols. In one embodiment, SAHA 308 comprises a digital certificate and/or embedded secret and combines those elements with the unsecured data to generate secured data.

Dedicated state logic 306 is any logic circuit configured to interpret digital commands received from an external device, such as a host. In one embodiment, dedicated state logic 306 determines the validity of data that protocol interface 304 receives via communication channel 302 before sending request signal 314 to signal converter 310. Request signal 314 enables signal converter 310 to convert input signal 312 and to forward the converted signal to SAHA 308.

In one embodiment, if dedicated state logic 306 determines that the digital data it received from protocol interface 304 or any portion of that data (e.g., a digital command) is invalid or unauthorized, then state logic 306 refuses to send request signal 314 to signal converter 310 and/or to forward the processed and secured data to the host via protocol interface 304. On the other hand, if dedicated state logic 306 determines that the digital data received from protocol interface 304 comprises a valid digital data command issued by the host, state logic 306 initiates a signal conversion by signal converter 310 via request signal 314.

Signal converter 310 monitors input signal 312, which, as discussed, may be an analog stimulus that is converted by signal converter 310. In one embodiment, data resulting from the signal conversion, along with an embedded secret that is known to the host, are loaded into SAHA 308. The converted signal, together with a hash resulting from the security algorithm (i.e., a Message Authentication Code or MAC), are passed back to the host via protocol interface 304. Based on the hash the host may then verify the authenticity of the received data.

In one embodiment, state logic 306 receives digital data from protocol interface 304, interprets the data, and initiates a signal conversion by signal converter 310. The converted data generated by signal converter 310 is loaded into SAHA 308. SAHA 308 uses an embedded secret, such as a previously installed Private Key, to generate a digital signature. The digital signature, a digital certificate that is pre-installed into SAHA 308, and the resulting data from the signal conversion are passed to the host via protocol interface 304. The host may then verify the digital certificate and use a corresponding Public Key to verify the authenticity of the digital signature.

In one embodiment, the converted data is loaded into SAHA 308 along with an embedded secret with which SAHA 308 performs an encryption on the converted data. The encrypted data is passed to a host that shares the same secret with SAHA 308 and uses the secret to decrypt the converted data to ensure that the data was transferred correctly and securely.

Figure 4:
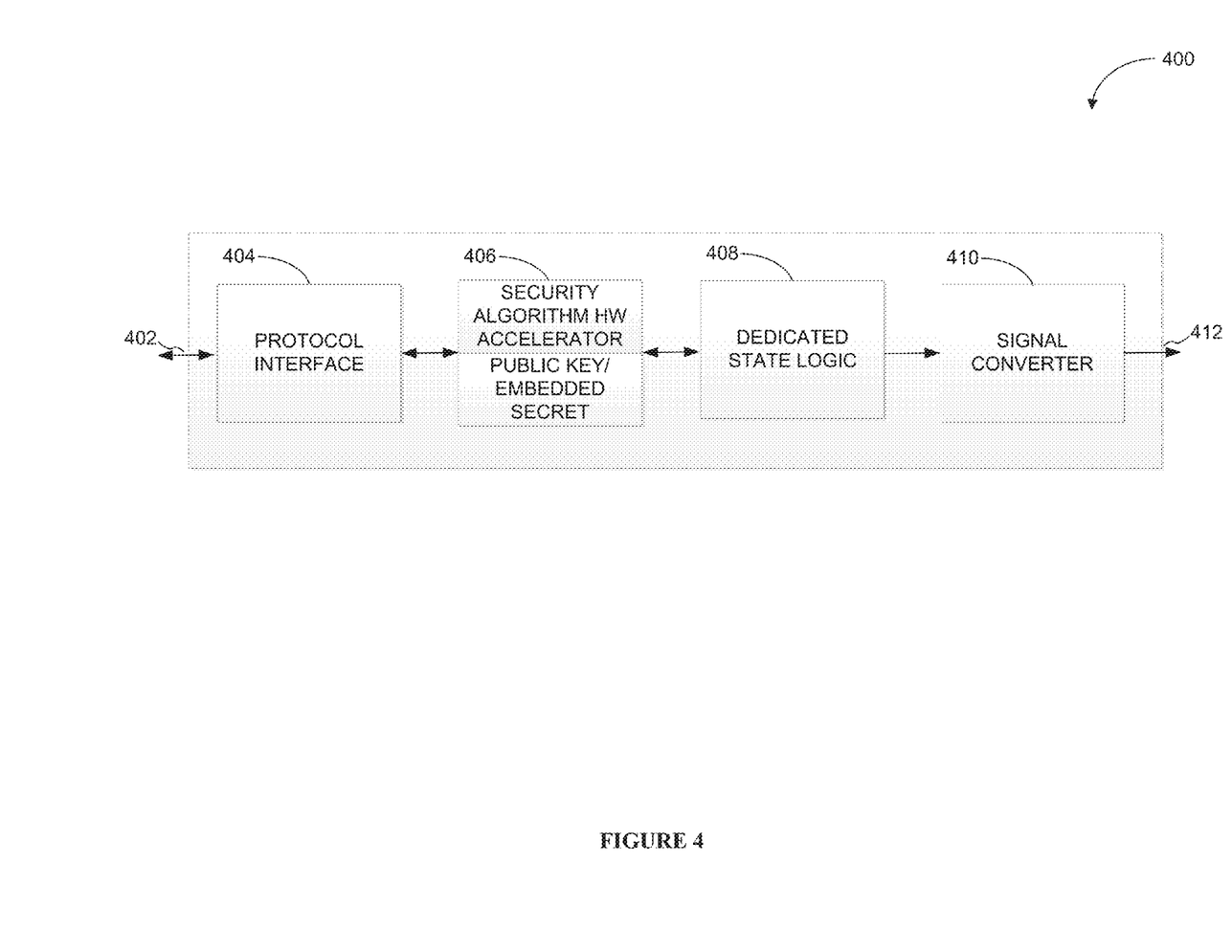
FIG. 4 is an exemplary functional block diagram of an actuator to securely process data according to various embodiments of the invention.

FIG. 4 is an exemplary functional block diagram of an actuator to securely process data according to various embodiments of the invention. Similar to FIG. 3, secure actuator 400 comprises protocol interface 404, SAHA 406, state logic 408, and signal converter 410. Protocol interface 404 is coupled to a communication channel 402 to receive data transmitted to actuator 400 from an upstream device, typically a host or any other computing system. The data may comprise digital data, including a control command, such as a an input message and a MAC, to control an application via signal 412 that is generated by actuator 400. Control signal 412 may be a digital-to-analog voltage signal, a PIO, a transducer input, etc.

Protocol interface 404 receives data via communication channel 402 and forwards it to SAHA 406. SAHA 406 applies a security protocol to the data. Security protocols include symmetric key hash functions, PKSD, or full encryption, which may alter the data with a Public Key and/or a secret embedded in SAHA 406.

In one embodiment, dedicated state logic 408 receives a secured digital data command processed by SAHA 406 and determines whether the command is valid. If so, dedicated state logic 408 initiates signal conversion by signal converter 410. Signal converter 410 may be a data converting device, such as a DAC, that converts the command into an analog data format. Analog signal 412 may be then transmitted to a device, such as an actuator or a transducer, that is designed to effectuate a received command.

In one embodiment, protocol interface 404 receives data comprising a command and a MAC sent by a host. Both are loaded into SAHA 406 and hash operation is performed on the command using a secret embedded in SAHA 406. The hash data resulting from the operation is compared to the MAC. If the hash data and the MAC match, state logic 408 determines that the command is authentic and forwards the authenticated command to signal converter 410 to commence a signal conversion. Conversely, if protocol interface 404 fails to receive the correct MAC, such that the comparison fails to produce an appropriate match, state logic 408 determines that the data is invalid and rejects the command. A signal conversion does not occur.

In one embodiment, SAHA 406 receives from a host, via protocol interface 404, data 402 comprising a digital certificate and a digital data command that is digitally signed by the host's Private Key. Both the digital signature and certificate are loaded into SAHA 406. SAHA 406 verifies the authenticity of the certificate by using a secret embedded in SAHA 406. The authenticity of the digital signature is verified using the host's Public Key. If both the digital signature and the certificate are deemed authentic and the command is valid, state logic 408 causes signal converter 410 to commence a signal conversion. However, if either the digital signature or the digital certificate are not authentic or the command is not valid, state logic 408 rejects the command and no signal conversion occurs.

In one embodiment, data 402 is an encrypted digital data command that is loaded into SAHA 406, where it is decrypted using a secret embedded in SAHA 406. If the decrypted command is valid, state logic 408 causes signal converter 410 to commence a signal conversion. Conversely, if the decrypted command is not valid, state logic 408 rejects the command and signal conversion does not occur.

Figure 5:
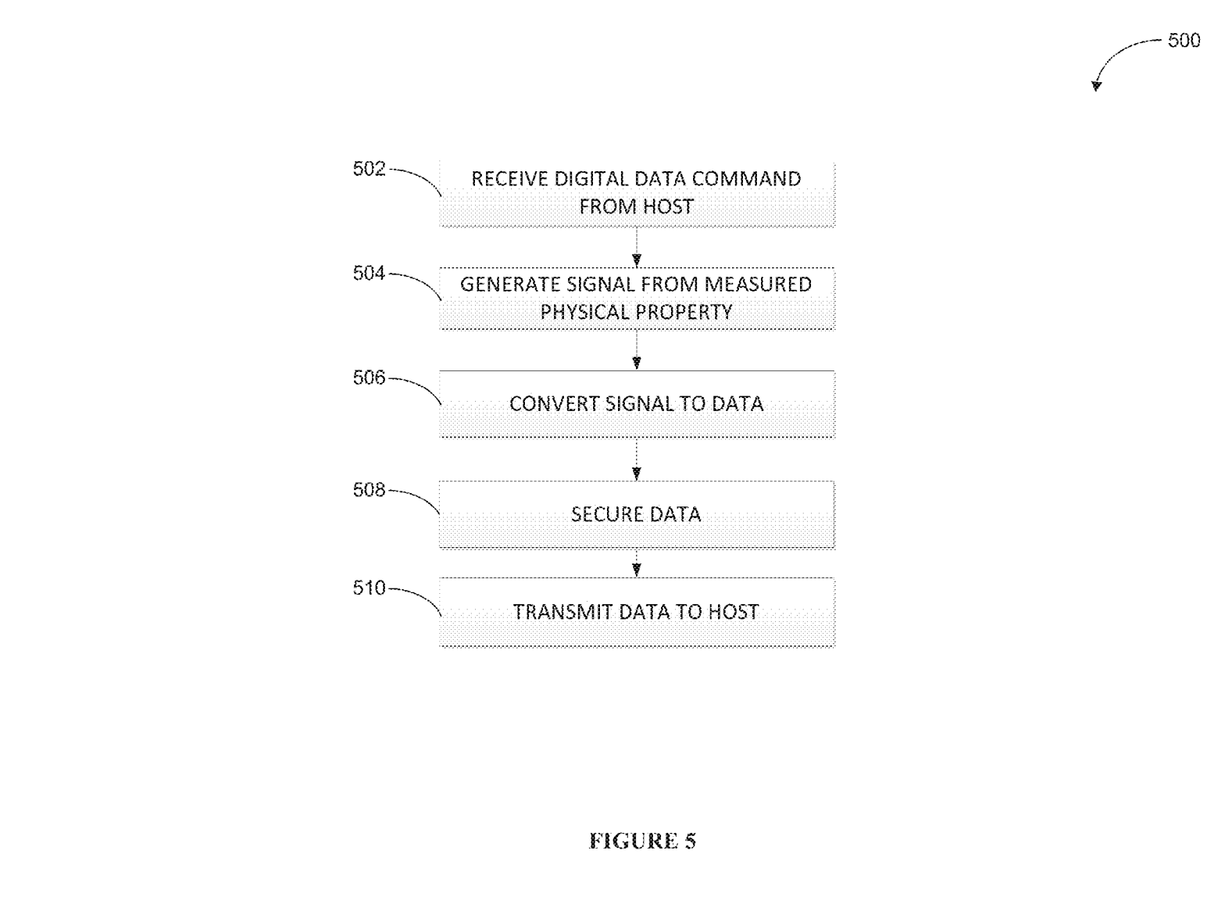
FIG. 5 is a flowchart of an exemplary process for securely processing data according to various embodiments of the invention.

FIG. 5 is a flowchart of an exemplary process for securely processing data according to various embodiments of the invention. The process to securely process and transmit data begins at step 502 by receiving a digital data command from a host, e.g., via a secure communication network or channel. The command comprises data representing, for example, a request to receive a sensor reading.

At step 504, a signal is generated that comprises data representing, for example, a physical property measured at a physical interface. In one embodiment, a security device may determine whether the data or the source from which the data was transmitted is valid.

At step 506, the signal generated in step 504 is converted into data. For example, the signal may be converted from an analog voltage signal into digital data. Signal conversion may take place automatically, in response to the digital data command, or in response to a request signal received by a signal converter.

At step 508, the converted data is secured, for example, by using a security device that applies a security protocol to the data. The security protocol may include encryption, applying a secret to the data, such as a hash algorithm, appending a digital signature or a certificate, and the like.

Finally, at step 510, the secured data is transmitted to a host via a suitable communication channel.

Figure 6:
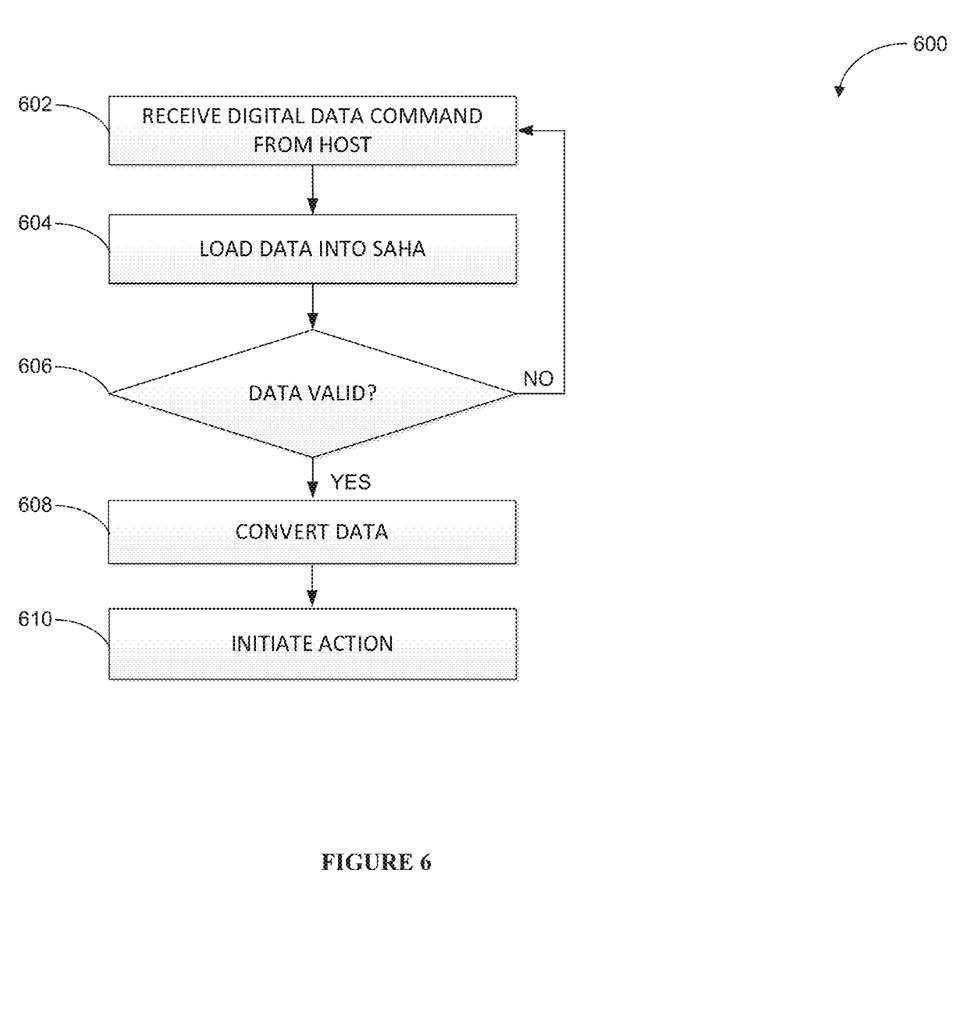
FIG. 6 is a flowchart of another exemplary process for securely processing data according to various embodiments of the invention.

FIG. 6 is a flowchart of another exemplary process for securely processing data according to various embodiments of the invention. The process begins at step 602 when data, for example, in the form of a digital data command, is received from a host. The host may have already secured the digital data prior to transmission using a security protocol. The digital data command may comprise a request to initiate an action.

At step 604, the digital data is loaded into a SAHA or any other secure device capable of determining the validity of data or the source thereof.

At step 606, it is determined whether the data is valid. For this purpose, the SAHA may apply a security protocol (e.g., a symmetric key hash function, Public Key/PKDS, full encryption) in order to determine the validity of the data. If it is determined that the data is valid, then process 600 proceeds to step 608 where the data is converted, for example, from digital to analog format. On the other hand, if the data is deemed invalid or if the SAHA determines that the data is not verified at step 606, then step 608 fails to occur and the process returns to step 602 and the host may retransmit the data.

Finally, at step 610 an action, including e.g., a system change or a system reconfiguration is initiated based on the verified and converted data. The action may be performed by an internal or external actuator, a PIO, a transducer, etc.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A state-machine based secure data-converting apparatus comprising:
    a signal converter coupled to receive a first signal from a physical data interface, the signal converter converts the first signal into a second signal;
    a logic circuit coupled to the signal converter and the data securing device, the logic circuit configured to receive a third signal from a host via a bidirectional communication channel and determine validity of the third signal that comprises at least one of a digital command, identifier information, and a shared secret;
    a data securing device coupled to the signal converter, the data securing device comprises a secret and applies a security protocol to the second signal without executing microcode.

2. The apparatus according to claim 1, wherein the logic circuit to generate a request signal in response to determining that the third signal is valid.

3. The apparatus according to claim 2, wherein the signal converter is configured to convert the first signal into the second signal in response to the fourth signal.

4. A secure data converting apparatus comprising:
    a data securing device coupled to exchange secure data with a host via a bidirectional communication channel, the data securing device receives a first signal comprising at least one of a digital command, identifier information, and a shared secret and applies a security protocol to the first signal to output a second signal;
    a logic circuit coupled to the data securing device to verify the authority of at least a portion of the second signal and output a verified signal; and
    a signal converter coupled to receive the verified signal to generate a control signal.

5. A method for securing data, comprising:
    receiving from a physical data interface a first set of data having a first format, the physical data interface configured for bidirectional data transmission between a host and a secured system;
    converting, within a first device, the first set of data into a second set of data having a second format and comprising at least one of a digital command, identifier information, and a shared secret;
    applying, within the first device, a security protocol to the second set of data without executing microcode to generate secured data; and
    outputting the secured data.

6. The method according to claim 5, wherein applying the security protocol further comprises receiving and authenticating at least a part of the second set of data.

7. The method according to claim 5, wherein applying the security protocol further comprises encrypting the second set of data.

8. The method according to claim 5, wherein applying the security protocol further comprises applying a secret.

9. The method according to claim 8, wherein the secret is at least one of a digital signature, a pre-installed digital certificate, and a hash algorithm.

10. The method according to claim 5, further comprising, applying the secured data to an external device to initiate an action.

11. A method for securing data, comprising:
    receiving digital data from a host, the digital data comprises a command;
    loading the digital data into a security device;
    applying, within the security device, a security protocol to at least a first portion of the digital data without executing microcode;
    applying a secret that is at least one of a digital signature, a pre-installed digital certificate, and an authentication code;
    determining via a logic circuit whether the first portion of the digital data is valid; and if the first portion of the digital data is valid,
    executing the command.

12. The method according to claim 11, further comprising, if the first portion of the digital data is invalid, rejecting the command.

13. The method according to claim 11, wherein executing comprises converting, within the first device, data in a first format to data in a second format.

14. The method according to claim 11, wherein applying the security protocol further comprises:
    performing a hash operation;
    generating hash data; and
    comparing the hash data to a message authentication code.

15. The method according to claim 11, wherein determining further comprises validating a source or destination associated with the data.

* * * * *